(12) United States Patent
Wirick

(10) Patent No.: US 8,532,174 B2
(45) Date of Patent: Sep. 10, 2013

(54) METHOD AND APPARATUS FOR DISTRIBUTING VIDEO PROGRAM MATERIAL

(75) Inventor: Kevin S. Wirick, Olivenhain, CA (US)

(73) Assignee: General Instrument Corporation, Horsham, PA (US)

( * ) Notice: Subject to any disclaimer, the term of this patent is extended or adjusted under 35 U.S.C. 154(b) by 1088 days.

(21) Appl. No.: 12/360,334

(22) Filed: Jan. 27, 2009

(65) Prior Publication Data

US 2010/0188581 A1    Jul. 29, 2010

(51) Int. Cl.
*H04N 7/12*         (2006.01)
*H04N 11/02*        (2006.01)

(52) U.S. Cl.
USPC .................................. 375/240.02; 375/240.26

(58) Field of Classification Search
None
See application file for complete search history.

(56) References Cited

U.S. PATENT DOCUMENTS

| | | | |
|---|---|---|---|
| 2007/0153914 A1* | 7/2007 | Hannuksela et al. | 375/240.26 |
| 2008/0310510 A1* | 12/2008 | Hiwasa et al. | 375/240.16 |
| 2009/0103603 A1* | 4/2009 | Hamano | 375/240.01 |

* cited by examiner

*Primary Examiner* — Marcus R Smith
(74) *Attorney, Agent, or Firm* — Susan R. Payne

(57) ABSTRACT

A method of distributing video program material includes encoding the program material in accordance with a first distribution constraint (CBR) to produce a first stream (A), encoding the program material in accordance with a second distribution constraint, which is more relaxed that the first distribution constraint, to produce a second stream (B), and employing the first and second streams to produce a third stream (C) representing differences between the first and second streams.

11 Claims, 3 Drawing Sheets

METHOD AND APPARATUS FOR DISTRIBUTING VIDEO PROGRAM MATERIAL

BACKGROUND OF THE INVENTION

This invention relates to a method and apparatus for distributing video program material.

The mechanisms that are currently used to distribute television program material to customers include cable, direct broadcast satellite, and IPTV (internet protocol television) over DSL (digital subscriber line).

Currently, cable system operators distribute television program material encoded by a coding algorithm that produces a bitstream conforming to the video coding standard known as MPEG 2. Some direct broadcast satellite (DBS) system operators distribute material encoded in MPEG 2 and some DBS system operators distribute material encoded by a coding algorithm that produces a bitstream conforming to the video coding standard known as MPEG 4. Telephone system operators (Telcos) that use DSL service to distribute television program material using IPTV encode the program material in MPEG 4. Cable system operators and DBS system operators typically encode with a variable bit rate (VBR) since the channel over which the bitstream is distributed has sufficient bandwidth to support the maximum bit rate of the bitstream, but Telcos encode with a constant bit rate (CBR) or capped variable bit rate due to the bandwidth constraints of DSL.

Referring to FIG. 1, a television program provider, such as HBO, may create a single program transport stream (SPTS) containing a television program service (corresponding to what is commonly referred to as a channel in the broadcast television domain) and transmit the SPTS by way of a satellite-borne transponder to the ground-based receivers of distribution system operators. The SPTS is transmitted to a DBS system operator, local headends (only one of which is shown in FIG. 1) of a cable system operator, and local headends (only one of which is shown in FIG. 1) of a telephone system operator. Each local headend of the cable system operator, such as Comcast, is connected to a local fixed line cable network. The cable system headend includes equipment that combines the program service contained in the SPTS with other program services, corresponding to other broadcast channels, to create a multi-program transport stream (MPTS) and transmits the MPTS to the cable system operator's customers over the cable network. Similarly, each local headend of the telephone system operator, such as Verizon, is connected to portions of the public fixed line telephone network and the telephone system headend equipment creates an MPTS containing multiple television program services and transmits the MPTS to customers over the telephone network. The DBS system operator, such as DirecTV, employs equipment that creates an MPTS and transmits the MPTS to a satellite-borne transponder that relays the material directly to the customer's antenna without use of a ground-based headend or a fixed line distribution network.

Because MPEG 4 provides substantially better compression of video material than MPEG 2, the television program provider employs MPEG 4 coding to deliver program material to the distribution system operators. Consequently, cable system operators and some DBS system operators must transcode from MPEG 4 to MPEG 2, with resultant signal degradation. The television program provider transmits a VBR (variable bit rate) MPEG 4 transport stream and so a telephone system operator providing IPTV service over DSL must decode the VBR MPEG 4 transport stream and re-encode as MPEG 4 CBR or capped VBR. Thus, of the four classes of distribution system operators, only the DBS system operators that utilize MPEG 4 are able to distribute the MPEG 4 material transmitted by the television program provider without decoding and then encoding in a manner called for by the particular operators' network infrastructure.

Another approach to distribution of television program material is illustrated schematically in FIG. 2. As shown in FIG. 2, several television program providers supply program material to a satellite aggregator, which combines the program services to form a transponder MPTS and transmits the transponder MPTS to the DBS system operator, the cable system headends and the Telco headends. A distribution system operator may receive multiple transponder MPTSs and combine the individual services based on its own requirements, for example regarding service packages, to create distribution MPTSs for transmission to customers. As with the television program provider described with reference to FIG. 1, the satellite aggregator employs MPEG 4 coding to deliver program material to the distribution system operators, and all the distribution system operators except the DBS operator that utilizes MPEG 4 must decode the MPEG 4 material and encode in a manner called for by the particular operator's network infrastructure.

FIG. 3 illustrates in simplified form a flow chart of the encoding process for encoding pictures to produce a bit stream conforming to MPEG 4. The operation of the process is well known to those skilled in the art and therefore will not be described in detail. Reference may, however, be made to Boice, U.S. Pat. No. 7,072,393 and to R. Shafer, T. Reagan and H. Schwartz, "The Emerging H.264/AVC Standard," EBU TECHNICAL REVIEW, January 2003, the entire disclosure of each of which is hereby incorporated by reference herein for all purposes.

The MPEG 4 encoder treats each uncoded picture as comprising one luma sample array and two chroma (Cb and Cr) sample arrays. The front end 20 of the MPEG 4 encoder divides each picture into a set of luma macroblocks and two (Cb and Cr) sets of chroma macroblocks. For each macroblock, the encoder front end generates an array of numbers representing the luma, Cb or Cr sample values of pixels in the macroblock and transforms the array of chroma or luma sample values into a set of direct cosine transform (DCT) frequency coefficients. Thus, for each macroblock, the front end 20 outputs at the node 24 a DC value followed by a succession of vertical frequency coefficients representing the magnitude of vertical frequency information at predetermined spatial frequencies, and a succession of horizontal frequency coefficients representing the magnitude of horizontal frequency information at predetermined spatial frequencies. For the purpose of this description, the DC value is considered to be a frequency coefficient. As shown in FIG. 3, the front end 20 also outputs motion data (or predictive information) that is generated by a motion compensation function.

The frequency coefficients are quantized. The manner in which the MPEG 4 encoder quantizes the frequency coefficients depends on whether the bit stream is to be CBR or VBR, which, in turn, generally depends on the bandwidth of the channel over which the bit stream is to be communicated. The bit rate of the bit stream may be controlled by adjusting the step size with which the DCT coefficients are quantized. An encoder produces a bit stream having a constant bit rate by adjusting the step size based on a rate control algorithm such as that known as Test Model 5.

The quantized DCT coefficients and the motion data are entropy coded. In the case of the TV program provider shown in FIG. 1, the entropy coded bit stream is packetized to form a video packetized elementary stream (PES) and is combined with a corresponding audio PES to form the SPTS; in the case of the satellite aggregator shown in FIG. 2, the video PES and audio PES are combined with the video and audio PESs for other services to form the MPTS.

In the event that the channel has more than enough capacity to support a single service, multiple VBR services may be statistically multiplexed to optimize utilization of the capacity of the channel. Statistical multiplexing is commonly used to compose an MPTS having a maximum bit rate that is less than the sum of the peak bit rates of the individual program streams. Statistical multiplexing of multiple services is accomplished by calculating the complexity of each service (number of bits required for a current picture multiplied by the average quantization step for the picture) and allocating bit rate to each service depending on the relative complexity of the services respectively.

SUMMARY OF THE INVENTION

In accordance with a first aspect of the subject matter disclosed herein there is provided a method of distributing video program material, including encoding the program material in accordance with a first distribution constraint (CBR) to produce a first stream (A), encoding the program material in accordance with a second distribution constraint, which is more relaxed that the first distribution constraint, to produce a second stream (B), and employing the first and second streams to produce a third stream (C) representing differences between the first and second streams.

In accordance with a second aspect of the subject matter disclosed herein there is provided a computer readable medium containing software that, when executed by a computer having an input for receiving video program material, performs a method including encoding the program material in accordance with a first distribution constraint (CBR) to produce a first stream (A), encoding the program material in accordance with a second distribution constraint, which is more relaxed that the first distribution constraint, to produce a second stream (B), and employing the first and second streams to produce a third stream (C) representing differences between the first and second streams.

In accordance with a third aspect of the subject matter disclosed herein there is provided apparatus for distributing video program material, including a first encoder for encoding the program material in accordance with a first distribution constraint (CBR) to produce a first stream (A), a second encoder for encoding the program material in accordance with a second distribution constraint, which is more relaxed that the first distribution constraint, to produce a second stream (B), and a separator for employing the first and second streams to produce a third stream (C) representing differences between the first and second streams.

In accordance with a fourth aspect of the subject matter disclosed herein there is provided a method of processing a transport stream that contains a first stream representing frequency coefficients derived from blocks into which a sequence of pictures has been divided, the first stream having a constant bit rate, and also contains a supplemental data stream representing frequency coefficient adjustments derived from said blocks, the method comprising separating the first stream and the supplemental data stream from the transport stream, entropy decoding the first stream and the supplemental data stream, and combining the first stream and the supplemental data stream on a frequency coefficient basis to form a third stream representing adjusted frequency coefficients.

In accordance with a fifth aspect of the subject matter disclosed herein there is provided a computer readable medium containing software that, when executed by a computer having an input for receiving a transport stream that contains a first stream representing frequency coefficients derived from blocks into which a sequence of pictures has been divided, the first stream having a constant bit rate, and also contains a supplemental data stream representing frequency coefficient adjustments derived from said blocks, processes the transport stream by a method comprising separating the first stream and the supplemental data stream from the transport stream, entropy decoding the first stream and the supplemental data stream, and combining the first stream and the supplemental data stream on a frequency coefficient basis to form a stream representing adjusted frequency coefficients.

In accordance with a sixth aspect of the subject matter disclosed herein there is provided apparatus for processing a transport stream that contains a first stream representing frequency coefficients derived from blocks into which a sequence of pictures has been divided, the first stream having a constant bit rate, and also contains a supplemental data stream representing frequency coefficient adjustments derived from said blocks, said apparatus comprising a transport demultiplexer for separating the first stream and the supplemental data stream from the transport stream, entropy decoders for decoding the first stream and the supplemental data stream, and a combiner for combining the first stream and the supplemental data stream on a frequency coefficient basis to form a third stream representing adjusted frequency coefficients.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 4:
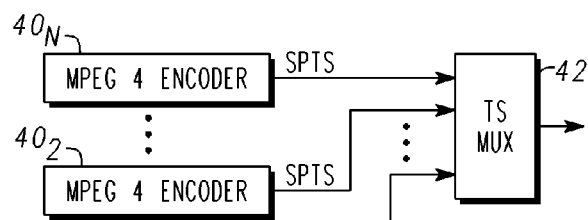
FIG. 4 is a flow chart of an encoding process implemented by an encoder embodying the present invention.
Figure 4:
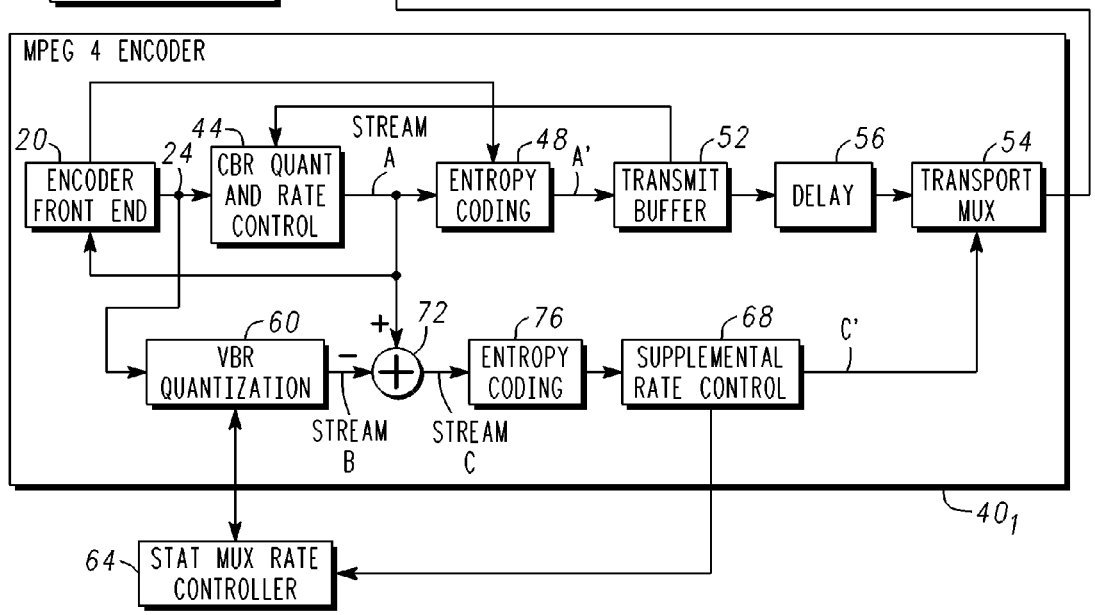

FIG. 4 illustrates several MPEG 4 encoders $40_1$-$40_N$ embodying the subject matter disclosed in this application. The encoders 40 may be used by a satellite aggregator receiving services from several program providers or by a program provider that supplies multiple services. Each encoder 40 receives a baseband input video signal representing a single service and outputs an SPTS containing that service. The manner in which the encoder constructs the SPTS is described in detail below, but suffice it at this point to state that the SPTS has a variable bit rate and that the outputs of the several encoders are supplied to a transport stream multiplexer 42 which creates an MPTS containing the several programs.

Figure 1:
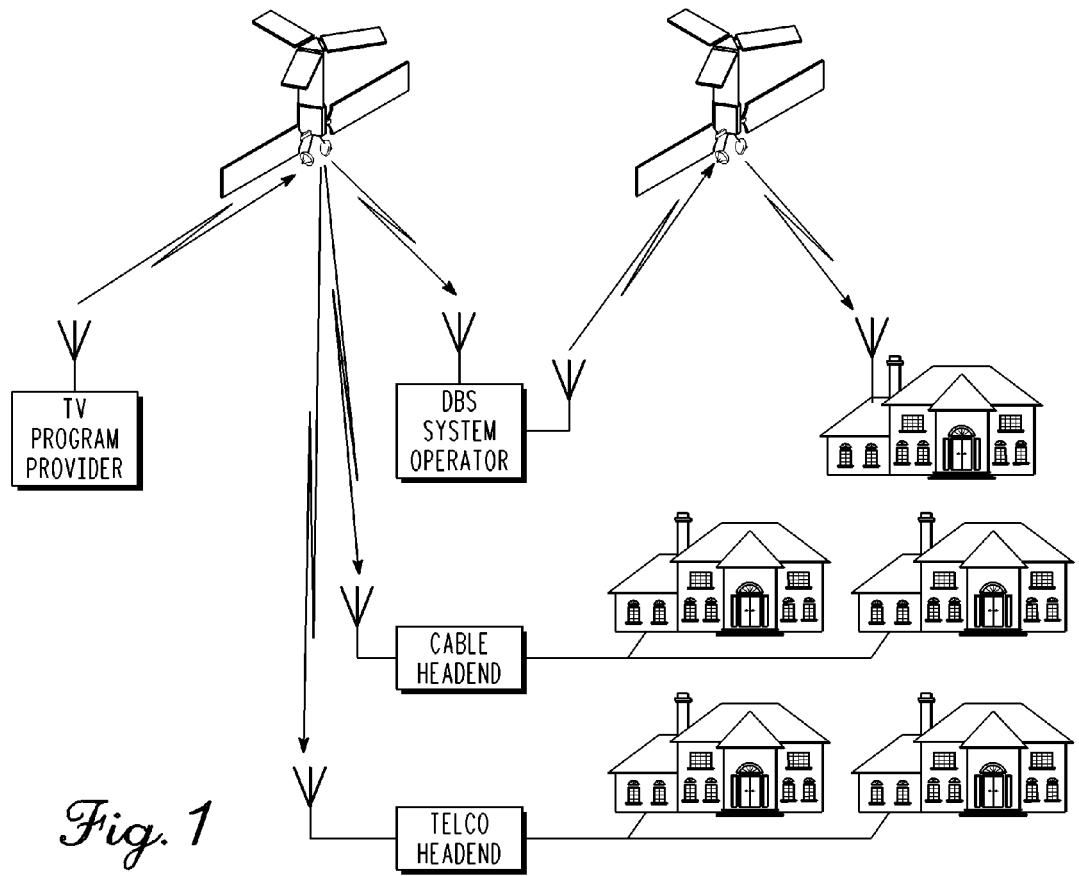
FIG. 1 is a schematic illustration of current modes of distributing television program material to customers having different types of receiving equipment.
Figure 2:
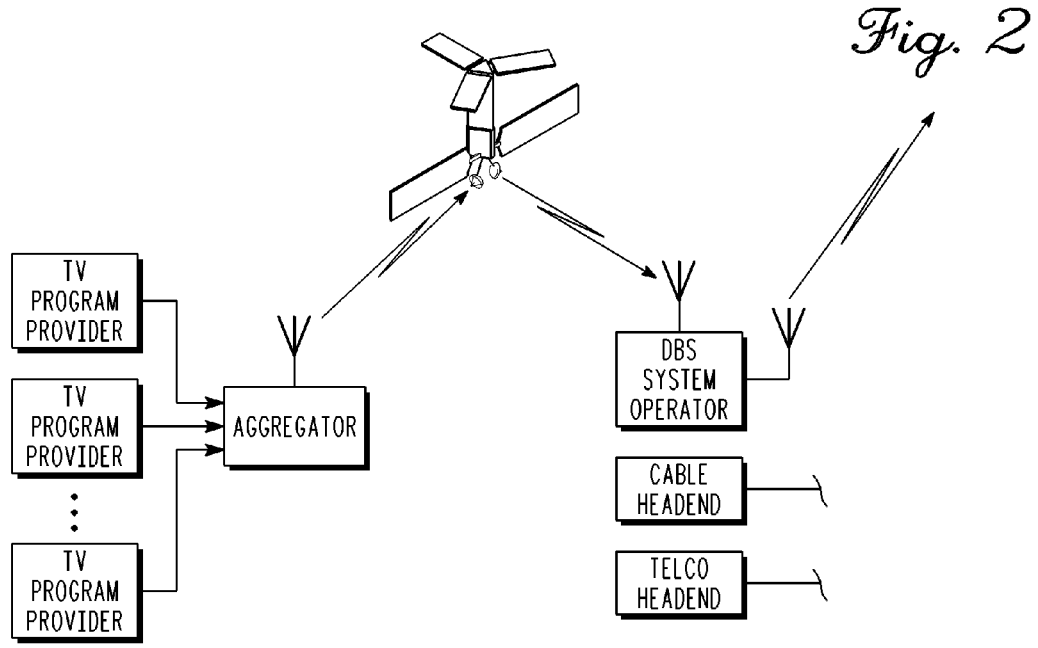
FIG. 2 is a schematic illustration of an alternative mode of distributing television program material.
Figure 3:
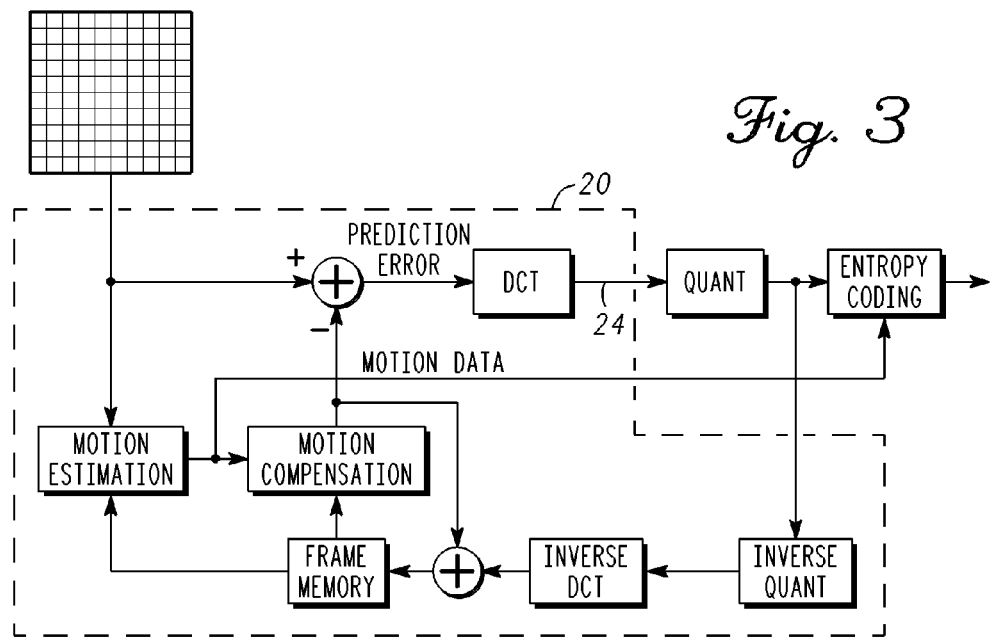
FIG. 3 is a flow chart of an encoding process implemented by a conventional MPEG 4 encoder.

Each MPEG 4 encoder 40 has a front end 20, which may be of conventional form and receives a baseband video signal representing a sequence of uncoded pictures in a standard baseband signal format, such as the HD-SDI signal format defined in SMPTE 292M. The front end 20 of the MPEG 4 encoder shown in FIG. 4 corresponds to the functional block designated 20 in FIG. 2. Thus, the output signal of the front end 20, provided at the node 24, is a bit stream representing DCT frequency coefficients. The encoder front end 20 also provides an output signal conveying motion data (corresponding to the data that the motion estimation function included in the block 20 shown in FIG. 3 provides to the entropy coding function).

The bit stream representing the DCT frequency coefficients is applied to two processing paths. The CBR path contains a CBR quantization and rate control block 44 which quantizes the frequency coefficients (including the DC value) by applying a selectively adjustable quantization step size to the coefficient values and outputs a bit stream (stream A) representing the values of the quantized coefficients. The CBR quantization block 44 constrains stream A to a constant bit rate in a manner that will be described in greater detail below.

Stream A and the motion data are applied to an entropy coding block 48, which compresses stream A and the motion data and produces a compressed stream A'. The compression technique may be conventional, and produces a bitstream that complies with MPEG 4, although in another implementation of the disclosed subject matter the compression technique may produce a bit stream that complies with a video compression standard other than MPEG 4. The compressed stream A' is loaded into a transmit buffer 52, which outputs the bit stream at the selected constant bit rate and provides a buffer fullness signal to the rate control function of the CBR quantization block. The CBR quantization block responds to the buffer fullness signal by adjusting the quantization step size, for example in accordance with Test Model 5, to achieve the desired constant bit rate. The CBR bitstream A' is supplied to a transport multiplexer 54 via a delay 56.

The bit stream representing the DCT frequency coefficients is also supplied to a VBR path which includes a VBR quantization block 60. The VBR quantization block 60 quantizes the frequency coefficients (including the DC value) and outputs a bitstream (stream B) representing the values of the quantized coefficients.

The VBR quantization block operates in conjunction with a statmux rate controller 64, which employs feedback to allocate bandwidth depending on the needs of stream B. The statmux rate controller receives supplemental rate control information from a supplemental rate controller 68 (described in more detail below) of each encoder $40_1$-$40_N$ and receives picture complexity information from the VBR quantization block of each encoder $40_1$-$40_N$ and allocates bit rate to the VBR service of each encoder depending on the supplemental rate control information and the relative complexity of all the VBR services, and possibly on minimum and maximum bit rates established for each VBR service. The VBR quantization blocks of the encoders $40_1$-$40_N$ implement the respective bit rate allocations imposed by the statmux rate controller by adjusting the respective quantization step sizes.

The VBR stream (stream B) and the CBR stream (stream A) are supplied to a difference block 72, which compares each macroblock in stream A with the corresponding macroblock in stream B and calculates the difference between each DCT coefficient in the stream A macroblock and the corresponding DCT coefficient in the stream B macroblock (subject to a minimum difference threshold). In this manner, the difference block generates a third stream (stream C). The stream C is VBR and its bit rate may vary quite widely, between zero and a fairly large value, for example in the event of a scene change.

The MPEG encoder delivers stream C to a second entropy coding block 76, which compresses stream C by a technique that may be conventional and produces a bit stream that complies with the same video compression standard as stream A'. Stream C is supplied to the supplemental rate controller 68, which supplies stream C' to the transport multiplexer 54. The supplemental rate controller caps the bit rate of stream C' to a relatively small proportion of the bit rate of stream A'. For example, in an embodiment of the disclosed subject matter, the supplemental rate controller may limit the bit rate of stream C' to 10-20% of the bit rate of stream A' even though the maximum bit rate of stream C may be substantially more than 20% of the bit rate of stream A'. Accordingly, the delay 56 is provided to delay stream A' sufficiently that the end of the bits in stream A' for a particular macroblock will approximately coincide with the end of the bits in stream C for the same macroblock, as received by the transport multiplexer. In a practical implementation, the delay may be several frames of video so that the VBR information is available to improve the picture quality during a scene that is demanding to compress with CBR.

The supplemental rate controller 68 reports the bit rate of stream C' to the statmux rate controller 64, which controls the quantization step size of the VBR quantization process so that the bit rate of stream B takes account of the desired limits on the bit rate of stream C'. The statmux rate controller 64 allocates bit rate to stream B having regard to the complexity of all the VBR services. Thus, if the complexity of the VBR service provided by the MPEG encoder $40_1$ is substantially smaller than the complexity of the VBR service provided by the encoder $40_2$, the statmux rate controller may limit the bit rate of stream C' produced by the encoder $40_1$ to 10% of the bit rate of stream A' while permitting the bit rate of stream C' produced by the encoder $40_2$ to be as much as 20% of the bit rate of stream A'.

The transport multiplexer 54 outputs an SPTS containing the CBR stream A' and the supplemental VBR stream C' as a supplemental or ancillary data elementary stream under a different program identification (PID) from stream A'. The SPTS of program 1 is supplied to the transport stream multiplexer 42 which also receives the SPTSs of programs 2-N, provided by the encoders $40_2$-$40_N$ respectively, and generates a statistically multiplexed MPTS containing both the CBR service and the supplemental VBR service for each program. The MPTS is supplied to a satellite uplink operator, which employs a transmitter to transmit the MPTS to a cable headend, a DBS system operator and a Telco headend, via a satellite-borne transponder.

Figure 5:
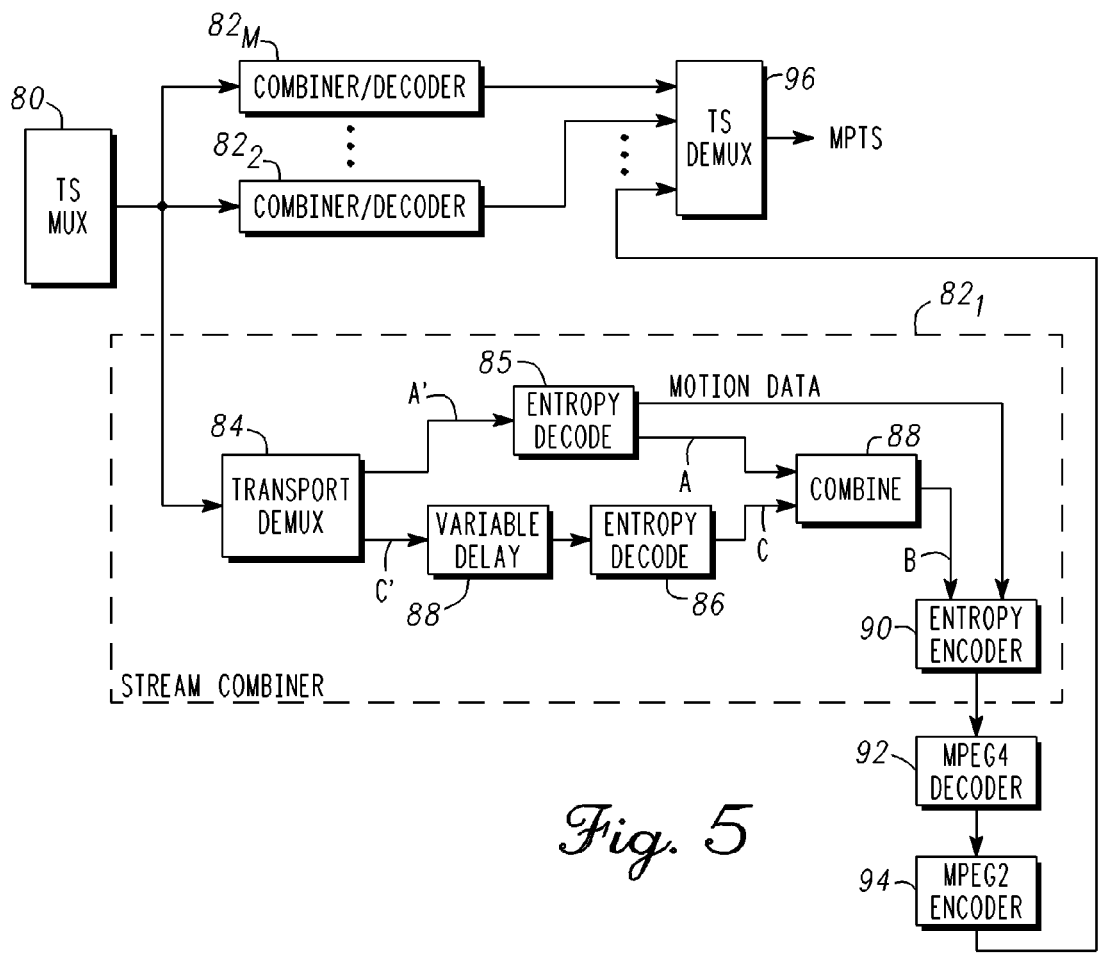
FIG. 5 is a flow charge of a stream combining process for combining streams produced by the encoding process illustrated in FIG. 4.

The cable system operator wishes to distribute the television program material as an MPEG 2 VBR bit stream. Referring to FIG. 5, the local cable system headend includes a transport stream demultiplexer 80 that receives the MPTS and selects, for example, stream A' and stream C' for program 1 and supplies an SPTS containing these services to a stream combiner $82_1$. The stream combiner includes a transport demultiplexer 84, which disassembles the SPTS and supplies stream A' to an entropy decoder 85 and stream C' to an entropy decoder 86 via a variable delay 88. The variable delay compares the timing information in stream A' and the timing information in stream C' and delays and buffers stream C' by a variable amount to synchronize stream C' with stream A', both to compensate for the delay imposed on stream A' by the delay 56 and to convert stream C' from capped VBR to VBR. The entropy decoder 85 decodes stream A' and thereby recovers stream A and the motion data whereas the entropy decoder 86 recovers stream C. The recovered streams A and C are combined (88) on a macroblock basis by adding each DCT coefficient of the stream C macroblock to the corresponding DCT coefficient of the stream A macroblock. In this manner, the recovered streams A and C are combined to recreate the VBR stream B. Stream B and the motion data are then entropy encoded (90) to produce a coded bitstream conforming to MPEG 4. The MPEG 4 VBR bitstream may be decoded to baseband HD-SDI with a standard MPEG 4 decoder 92 and re-encoded to MPEG 2 VBR with a standard MPEG 2 encoder 94. A transport stream multiplexer 96 combines the compressed stream B for program 1 with MPEG 2 streams for other programs, provided by the stream combiners 82₂-82_M, to form the MPTS that is delivered over the cable network to subscribers for decoding.

The configuration shown in FIG. 5 may also be used by a DBS system operator that distributes program material as an MPEG 2 VBR bitstream.

A DBS system operator that distributes an MPEG 4 VBR bitstream supplies the output of the entropy encoder 90 directly to the transport stream multiplexer 96, without transcoding.

A telephone system operator that distributes an MPEG 4 CBR bitstream transmits stream A from the transport demultiplexer 84 without modification.

By efficiently coding the difference between stream A (CBR) and stream B (VBR) it is possible to transmit substantially the entire content of both streams in a bandwidth that is slightly more than that of stream A and provide, at the stream combiner, the CBR stream A to a Telco providing IPTV over DSL and the recreated VBR stream B both in MPEG 2 for a cable system operator and in MPEG 4 for a DBS system operator.

Figure 6:
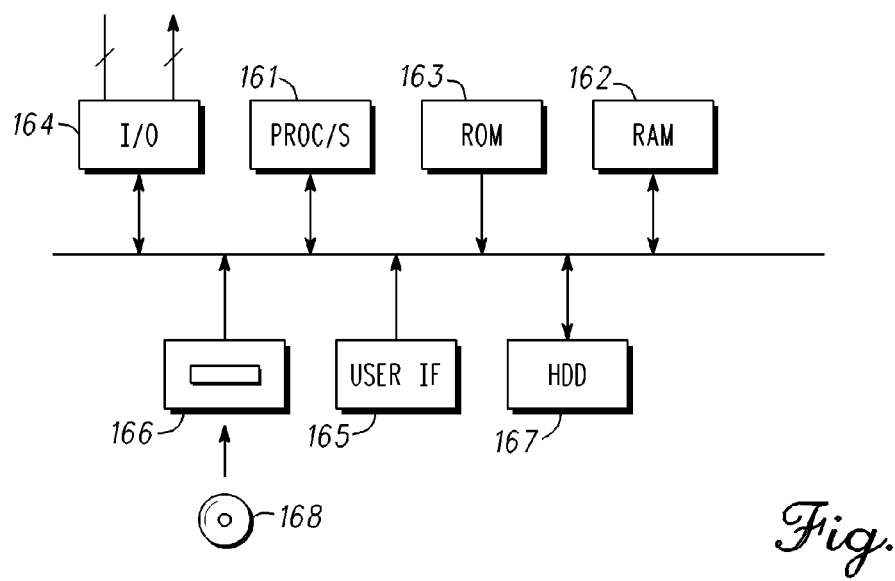
FIG. 6 is a block schematic diagram of a computing machine that may be used to implement parts of the encoding process described with reference to FIG. 4 or partsof the stream combining process described with reference to FIG. 5.

Referring to FIG. 6, the MPEG 4 encoder shown in FIG. 4 may be implemented using a computer comprising one or more processors 161, random access memory 162, read only memory 163, I/O devices 164, including suitable adaptors for receiving and transmitting encoded bitstreams, a user interface 165, a CD ROM drive 166 and a hard disk drive 167, configured in a generally conventional architecture. The I/O devices 164 include an input adaptor for receiving the baseband video signal and an output adaptor for transmitting the SPTS. The computer operates in accordance with a program that is stored in a computer readable medium, such as the hard disk drive 167 or a CD ROM 168, and is loaded into the random access memory 162 for execution. The program is composed of instructions such that when the computer receives the baseband video signal (typically in HD-SDI format), by way of the input adaptor, the computer allocates memory to appropriate buffers and utilizes other suitable resources and functions to perform the various operations that are described above with reference to FIG. 4.

It will be appreciated by those skilled in the art that the program might not be loadable directly from the CD ROM 168 into the random access memory utilizing the CD ROM drive 166 and that generally the program will be stored on the CD ROM or other program distribution medium in a form that requires the program to be installed on the hard disk drive 167 from the CD ROM 168.

Similarly, a computer may be configured to execute the functions of the stream combiner described with reference to FIG. 5 by loading a suitable program in the random access memory.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of distributing video program material, including:
    encoding the program material in accordance with a first distribution constraint (CBR) to produce a first stream (A),
    encoding the program material in accordance with a second distribution constraint, which is more relaxed than the first distribution constraint, to produce a second stream (B),
    employing the first and second streams to produce a third stream (C) representing differences between the first and second streams, and
    entropy encoding both the first stream (A) and the third stream (C), and creating a single program transport stream containing the first stream (A) as a packetized elementary stream and containing the third stream (C) as supplementary data.

2. A method according to claim 1, wherein the first distribution constraint is that the first stream has a constant bit rate and the second distribution constraint is that the stream has a variable bit rate.

3. A method according to claim 1, including, before the steps of encoding the program material in accordance with the first and second distribution constraints, receiving a sequence of pictures, dividing each picture into blocks of chroma and luma values, and transforming the chroma and luma values to a set of frequency coefficients for each block, and wherein the step of employing the first and second streams to produce a third stream comprises subtracting a frequency coefficient of the first stream from a corresponding frequency coefficient of the second stream, whereby the third stream comprises, for each block, a succession of difference coefficients.

4. A nontransitory computer readable medium containing software that, when executed by a computer having an input for receiving video program material, performs a method including:
    encoding the program material in accordance with a first distribution constraint (CBR) to produce a first stream (A),
    encoding the program material in accordance with a second distribution constraint, which is more relaxed that the first distribution constraint, to produce a second stream (B), and employing the first and second streams to produce a third stream (C) representing differences between the first and second streams, and entropy encoding both the first stream (A) and the third stream (C), and creating a single program transport stream containing the first stream (A) as a packetized elementary stream and containing the third stream (C) as supplementary data.

5. Apparatus for distributing video program material, including:

a first encoder for encoding the program material in accordance with a first distribution constraint (CBR) to produce a first stream (A), a second encoder for encoding the program material in accordance with a second distribution constraint, which is more relaxed that the first distribution constraint, to produce a second stream (B), and a separator for employing the first and second streams to produce a third stream (C) representing differences between the first and second streams, and an entropy encoder for encoding both the first stream (A) and the third stream (C), and creating a single program transport stream containing the first stream (A) as a packetized elementary stream and containing the third stream (C) as supplementary data.

6. A method of processing a transport stream that contains a first stream representing frequency coefficients derived from blocks into which a sequence of pictures has been divided, the first stream having a constant bit rate, and also contains a supplemental data stream representing frequency coefficient adjustments derived from said blocks, the method comprising:

separating the first stream and the supplemental data stream from the transport stream, wherein bit rate of the supplemental data stream is less than the constant bit rate of the first stream, entropy decoding the first stream and the supplemental data stream, and combining the first stream and the supplemental data stream on a frequency coefficient basis to form a third stream representing adjusted frequency coefficients.

7. A method according to claim 6, wherein the supplemental data stream represents differences between the first stream and a variable bit rate second stream representing said frequency coefficients.

8. A method according to claim 7, wherein the first and second streams are bit streams encoded in compliance with a first compression standard and the method comprises entropy encoding the third stream and decoding the third stream in accordance with a process for decoding a stream that has been encoded in compliance with the first compression standard.

9. A method according to claim 8, further comprising encoding the third stream in compliance with a second compression standard.

10. A nontransitory computer readable medium containing software that, when executed by a computer having an input for receiving a transport stream that contains a first stream representing frequency coefficients derived from blocks into which a sequence of pictures has been divided, the first stream having a constant bit rate, and also contains a supplemental data stream representing frequency coefficient adjustments derived from said blocks, processes the transport stream by a method comprising:

separating the first stream and the supplemental data stream from the transport stream, wherein bit rate of the supplemental data stream is less than the constant bit rate of the first stream, entropy decoding the first stream and the supplemental data stream, and combining the first stream and the supplemental data stream on a frequency coefficient basis to form a stream representing adjusted frequency coefficients.

11. Apparatus for processing a transport stream that contains a first stream representing frequency coefficients derived from blocks into which a sequence of pictures has been divided, the first stream having a constant bit rate, and also contains a supplemental data stream representing frequency coefficient adjustments derived from said blocks, said apparatus comprising:

a transport demultiplexer for separating the first stream and the supplemental data stream from the transport stream, wherein bit rate of the supplemental data stream is less than the constant bit rate of the first stream, entropy decoders for decoding the first stream and the supplemental data stream, and a combiner for combining the first stream and the supplemental data stream on a frequency coefficient basis to form a third stream representing adjusted frequency coefficients.

* * * * *